US006769075B2

United States Patent
Mastrianni et al.

(10) Patent No.: US 6,769,075 B2
(45) Date of Patent: Jul. 27, 2004

(54) METHOD AND APPARATUS FOR PERFORMING EMERGENCY SHUTDOWN OF A MALFUNCTIONING COMPUTER SYSTEM SAVING ALL OPEN FILES, DATA, AND WORK IN PROGRESS

(75) Inventors: Steven Mastrianni, Unionville, CT (US); David F. Bantz, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 09/823,056

(22) Filed: Mar. 30, 2001

(65) Prior Publication Data

US 2002/0144180 A1 Oct. 3, 2002

(51) Int. Cl.[7] ............................................... G06F 11/00
(52) U.S. Cl. .............................................. 714/20; 714/5
(58) Field of Search ............................... 714/5, 20, 23, 714/24

(56) References Cited

U.S. PATENT DOCUMENTS

| | | | | |
|---|---|---|---|---|
| 5,524,190 A | * | 6/1996 | Schaeffer et al. | 715/522 |
| 5,715,462 A | * | 2/1998 | Iwamoto et al. | 717/173 |
| 5,911,060 A | * | 6/1999 | Elliott | 718/100 |
| 6,009,258 A | * | 12/1999 | Elliott | 703/22 |
| 6,151,569 A | * | 11/2000 | Elliott | 703/22 |
| 6,630,946 B2 | * | 10/2003 | Elliott et al. | 345/781 |

\* cited by examiner

Primary Examiner—Robert Beausoliel
Assistant Examiner—Bryce P. Bonzo
(74) Attorney, Agent, or Firm—Louis P. Herzberg; Harrington & Smith, LLP

(57) ABSTRACT

A method includes steps of (A) detecting an activation of a user input that indicates that the system, or a program executed by the system, has become non-responsive to a user; (B) determining an identification of any currently open files and programs with which currently open files are associated; (C) determining an identification of those programs that are normally not in a non-responsive state; and (D) saving those currently open files that are associated with programs that are identified as being not normally in the non-responsive state. A next step notifies the user that any currently open files that are associated with programs identified as being not normally in the non-responsive state have been saved. In a further step the user may restart the digital data processing system, and retrieve at least one of the saved files. The step of detecting can be executed in response to the user manually activating a switch or by the user activating one or more keyboard keys. The step of saving saves in association with the currently open files an identification of their associated programs, and saves the currently open files in a data storage device that forms a part of the system, and/or in a data storage device that is remote from the system, and that is reached through a data communication network. The step of determining an identification of any currently open files preferably includes the preliminary step of monitoring system file open and file close operations, and maintaining a record of those files that are currently open and a record of a program that opened the file.

20 Claims, 2 Drawing Sheets

METHOD AND APPARATUS FOR PERFORMING EMERGENCY SHUTDOWN OF A MALFUNCTIONING COMPUTER SYSTEM SAVING ALL OPEN FILES, DATA, AND WORK IN PROGRESS

CROSS-REFERENCE TO A RELATED PATENT APPLICATION

This patent application is related to U.S. patent application Ser. No. 09/823,049, filed on even date herewith, entitled "METHOD AND APPARATUS FOR PERFORMING EMERGENCY SHUTDOWN OF A MALFUNCTIONING COMPUTER SYSTEM SAVING ALL OPEN FILES, DATA, AND WORK IN PROGRESS TO A REMOTE DATA STORAGE BUSINESS ENTITY", by David Bantz and Steven Mastrianni.

FIELD OF THE INVENTION

This invention relates generally to digital data processing systems and methods and, more particularly, to methods and apparatus for ameliorating the adverse effects of data processing system malfunctions.

BACKGROUND OF THE INVENTION

As computer operating systems have grown more complex and feature-rich, they have also grown significantly larger. In order to more effectively manage these large software systems the functionality of the operating system has been partitioned into separate modules or components. The underlying rationale in partitioning the operating system is that dividing up a complex software system into smaller pieces makes the operating system easier to develop and maintain. While this may be true to a first order, the fact is that personal computer (PC)-based operating systems such as, but not limited to, Microsoft Windows 95™, Microsoft Windows 98™, and Microsoft Windows 2000™ all experience "crashes" or "hangs", requiring the user to reboot the PC, or in some cases to cycle the power off and then on in order to restore the PC to an operational status.

It should be noted that not all of these problems are the fault of the operating system, and may instead actually be the fault of a running application. For example, the applications programmer may have forgotten to test a program path, or a program path was never traversed during testing so that some problem did not appear. In some cases, faults in the application may simply be the result of poor programming, or the failure to check the success or failure of a particular function call. Whatever the reason, the result is that the user's PC can become unresponsive or non-responsive and effectively unusable until the system is rebooted or powered off and then back on. As many users have experienced, such problems typically occur at the most inopportune times, such as when a document or a spreadsheet must be quickly completed in order to make a deadline. Furthermore, the occurrence of these types of system failure events is unpredictable, and may occur at any time during use of the operating system or application.

One common failure mode is that a program is "leaking" memory, i.e., gradually using up small amounts of memory without releasing the used portions. This results in physical RAM memory capacity being slowly consumed until there is no more available. This type of failure mode typically causes the operating system to stop responding to user input such as keyboard strokes or mouse clicks. Because this type of failure occurs slowly over time, the user may have been working on a document or presentation for quite a while, and may have made many changes or additions to the work in progress. When the system stops responding, the user will be unable to save the work in progress, resulting in a high probability that the work in progress will be lost. In order to restore the system to a functional state the user is typically required to reboot or power cycle the system, resulting in the loss of all or at least some edits to the work in progress being lost.

Another less common problem occurs when a program consumes most or all of the computer's processing capability, thereby starving other programs of computer time for proper execution. In this situation, the system may not respond to the user's mouse movements and certain keyboard commands, including the command to restart the system, requiring the user power cycle the system in order to restore the system to a functional state.

As can be appreciated, a need exists to lessen and ideally avoid the negative impact of such system failures on the user's work environment.

SUMMARY OF THE INVENTION

The foregoing and other problems are overcome by methods and apparatus in accordance with embodiments of this invention. The teachings of this invention provide methods and apparatus to enable an orderly shutdown of a malfunctioning computer system, while saving user-desired work in progress.

In one aspect this invention provides a software program and software device driver mechanism that is installed on a computer system to be protected. In accordance with these teachings of this invention the software program "hooks" or connects or links to the operating mechanism that is the single point of entry for a file open request. When a program makes a request to open a file, the request is detected, and the name of the requesting program is identified and saved along with other information, including the name of any file or files that the program is requesting to open. The data is saved as a protected database in a protected area of system memory, preferably but not necessarily a local disk drive.

The software program also "hooks" or connects or links to the single entry point for a file close function. Each time a program closes a file the close request is intercepted. The name of program closing the file is detected, along with other information, including the name of the file or files to be closed. The files are closed normally, and the protected database updated with the new information.

Each time a file is opened or closed, the protected program/file database on the disk is updated, as well as a copy stored in computer memory (RAM). When the system stops responding to user input, the offending program may still have one or more files open, and may be unable to respond to any user request to properly close the program. When this occurs, the user invokes the emergency shutdown procedure in accordance with these teachings by using a predetermined "button". The button may be located on the keyboard, or it may be mounted internally or externally from the computer system. The button may be implemented using a conventional type of pushbutton or other type of switch, or it may be implemented using some predetermined keyboard key sequence where the user depresses one or more keys, either sequentially or together. The special key combination is detected, and is used to invoke the operation of the orderly shutdown procedure in accordance with these teachings.

In operation, the orderly shutdown procedure enumerates the list of currently running programs and then by using a program state table determines which program or programs are no longer responding to user input. In accordance with a further aspect of these teachings, the resulting list of non-responding programs is compared to a list of non-responsive programs, i.e., a list of programs that are normally in a non-responsive state, to determine which user program or programs are not responding. The list of non-responsive programs preferably includes those programs that are part of the operating system and that normally run in a suspended or "not responding" mode.

After the identities of the user non-responding programs are determined, the orderly shutdown procedure attempts to read from the protected database to determine if any of the non-responding user programs have any files open. If the disk is not accessible, the information is read from the copy stored in the memory-resident database. The orderly shutdown procedure matches each non-responding program to any open file or files that it may have, copies the identified file or files to a temporary space on the local or a network disk while identifying these files with, by example, a date and time stamp, as well as the name of the non-responding program. When the open file copy procedure terminates, the orderly shutdown procedure may display a message box indicating that any open files have been saved, and that it is safe for the user to shutdown the system.

After the computer system is rebooted, the user locates the saved version of the file or files in the protected area and may then resume working at the point where work stopped.

In accordance with these teachings a method is disclosed for operating a digital data processing system, as is a digital data processing system that operates in accordance with the method.

The method includes steps of (A) detecting an activation of a user input that indicates that the system, or a program executed by the system, has become non-responsive to a user; (B) determining an identification of any currently open files and programs with which currently open files are associated; (C) determining an identification of those programs that are normally not in a non-responsive state; and (D) saving those currently open files that are associated with programs that are identified as being not normally in the non-responsive state. A next step notifies the user that any currently open files that are associated with programs identified as being not normally in the non-responsive state have been saved. In a further step the user may restart the digital data processing system, and retrieve at least one of the saved files.

The step of detecting can be executed in response to the user manually activating a switch or by the user activating one or more keyboard keys.

The step of saving saves in association with the currently open files an identification of their associated programs, and saves the currently open files in a data storage device that forms a part of the system, and/or in a data storage device that is remote from the system, and that is reached through a data communication network.

The step of determining an identification of any currently open files preferably includes the preliminary step of monitoring system file open and file close operations, and maintaining a record of those files that are currently open and a record of a program that opened the file.

BRIEF DESCRIPTION OF THE DRAWINGS

The objects, features and advantages of the present invention will be apparent to one skilled in the art, in view of the following detailed description taken in combination with the attached drawings, in which.

DETAILED DESCRIPTION OF THE INVENTION

Figure 1:
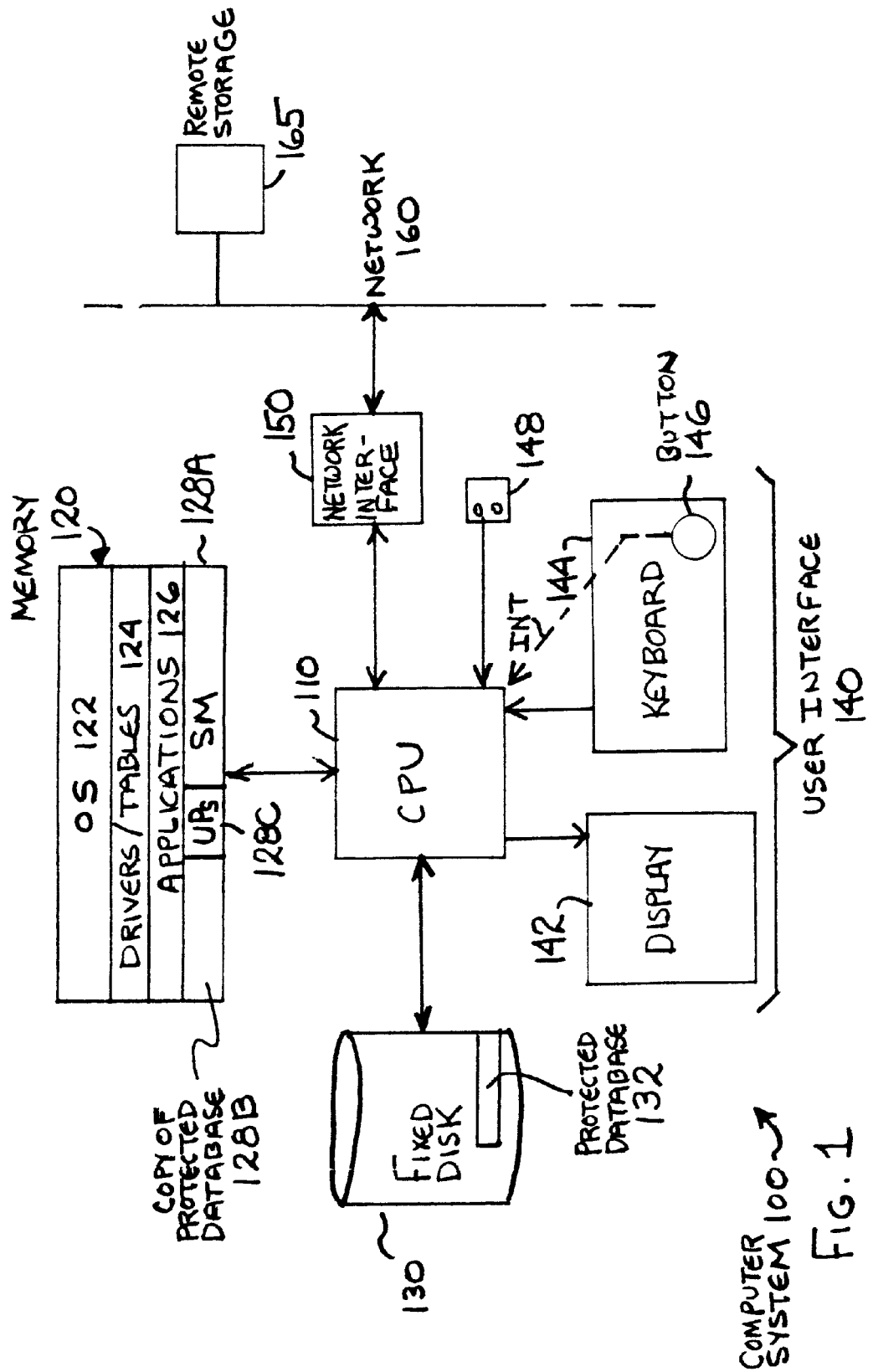
FIG. 1 illustrates a hardware block diagram depicting the orderly shutdown procedure in accordance with these teachings.

Referring to FIG. 1 a computer system 100 is illustrated that is suitable for practicing this invention. The computer system 100 may be a PC, or it may be a workstation, or a minicomputer or a main frame computer. The computer system 100 may also be integrated within some other type of device, such as a communications device, or a personal digital assistant (PDA), or an input device that digitizes a user's handwriting. As should be appreciated, the teachings of this invention may be used in any computing environment wherein a user is enabled to input information to the computer system 100, and where it is desirable to maintain and recover the entered information in the event of a computer system malfunction.

The exemplary computer system 100 may include at least one central processing unit (CPU) 110, a read/write memory 120, such as RAM or flash memory, a mass storage device such as a fixed or a removable disk 130 and/or a tape, a user interface 140 that includes a display 142, a keyboard 144 (or some other data entry device), and a pointing device 148, such as a mouse. A network interface 150 may be provided for coupling the computer system 100 to an external network 160, such as an intranet, an extranet, the internet, or any type of data communications network. The network 160 can include at least one type of remote mass storage device 165, such as a network disk drive or a network tape drive.

The memory 120 is assumed to store all or part of the operating system (OS) 122, as well as relevant device drivers and tables 124, as well as any desired applications 126. The applications could include, by example, a word processing applications, a spreadsheet application, a visual slide preparation application, a financial application, and/or any type of desired application. When not in use the program code that implements these applications may be stored on the fixed disk 130.

In accordance with these teachings the user interface 140 includes a button 146 that is activated by the user when it is desired to perform an orderly shutdown of one or more running applications 126, and to save all work that may be in progress (e.g., a document or a spreadsheet that is being composed or revised). The button 146 is shown for convenience as being located at the keyboard 144, although it may be located anywhere that is convenient for the user. The button 146 may be physically implemented using a conventional type of pushbutton or other type of switch, or it may be logically implemented using some predetermined keyboard key sequence where the user depresses one or more keys, either sequentially or together. Further by example, if the user interface 140 includes a voice recognition capability, the button 146 may be implemented by recognizing some predetermined user utterance. Also by example, if the user interface 140 includes a handwriting recognition capability, then the button 146 may be implemented, for example, by recognizing some predetermined sequence of strokes, or by recognizing stoke input made at some predetermined position on a handwriting tablet.

It is assumed that the button 146 is activated by the user when the computer system 100 ceases to respond to user inputs, e.g., when the system "freezes", or when the system provides some error message that it is unable to continue to operate. That is, it is assumed that the at least one program or application with which the user is interacting has ceased to accept the user's input, or to otherwise behave in a fashion that is inconsistent with the user's expectations.

However the button 146 may be implemented, when the user activates the button 146 a signal is sent via a suitable digital or analog interface to the CPU 110. For example, the button interface may convert the button signal into a system interrupt (INT). The interrupt, which is preferably installed at a high priority (and which may be non-maskable), invokes a software module (SM) 128A, that implements the teachings of this invention, to begin operating to save the relevant data files.

Figure 2:
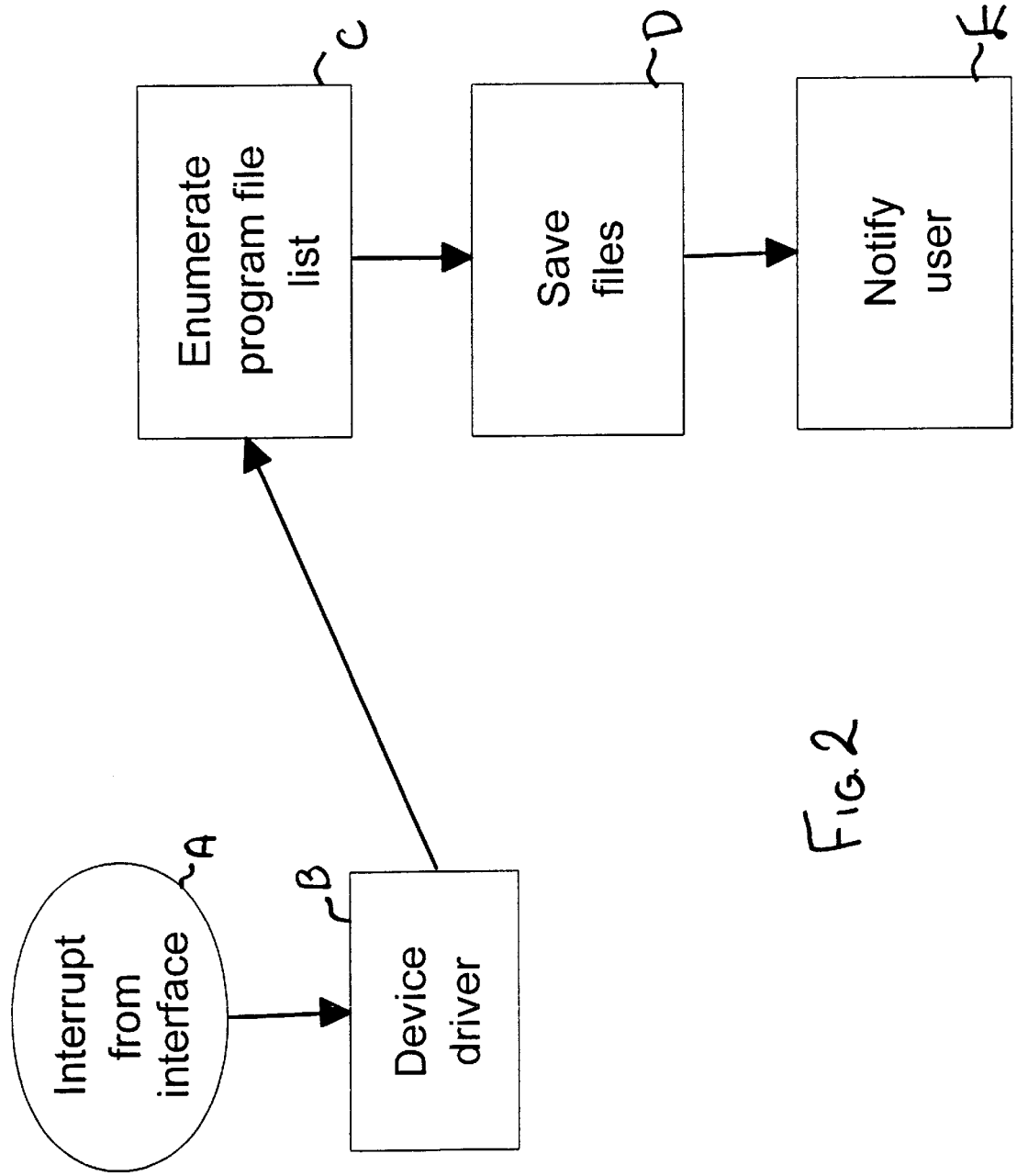
FIG. 2 is a logic flow diagram depicting the operation of the orderly shutdown procedure.

Referring now also to FIG. 2, at Step A the interrupt is received by the software module 128A and is routed to the device driver 124. At Step B the device driver 124 notifies the application 126 which enumerates the list of programs and their open files at Step C. At Step D the software module 128A saves information to a database 132, preferably a protected database, on the fixed disk 130 (and/or on the remote storage 165), and may also save a copy 128B in the memory 120. At Step E the software module 128A notifies the user that it is safe to shut down or power off the computer system 100.

Describing FIG. 2 now in further detail, and prior to the execution of the Steps A–E, i.e., during normal operation of the computer system 100, an element of the software module 128A "hooks" or connects or links to the operating mechanism that is the single point of entry for a file open request. When a program or application 126 makes a request to open a file, the request is detected and the name of the requesting program or application 126 is identified and saved along with other information, including the name of any file or files that the program is requesting to open. This information is saved as in the protected database 132. Optionally the copy of the protected database 128B is stored in the memory 120.

The software module 126A also "hooks" or connects or links to the single entry point for the file close function. Each time a program or application 126 closes a file the close request is intercepted. The name of program or application 126 closing the file is detected, along with other information, including the name of the file or files to be closed. The files are closed normally, and the protected database(s) 132, 128B are updated with the new information. In this manner the protected database 132 reflects, at any point in time, only those files that are currently open, as well as the application 126 with which the open files are associated.

This being the case, at Step C of FIG. 2 the orderly shutdown procedure executed by the software module 128A enumerates the list of currently running programs and then, by using a program state table maintained by the operating system 122 that forms a part of the drivers and tables 124, determines which program or programs are no longer responding (NLR) to user input. The resulting list of NLR programs is compared to a list of normally unresponsive programs (UPs) 128C, i.e., a list of programs that are normally in an unresponsive state. If an NLR program is found in the UP list no further action need be taken, since the program is normally in an unresponsive state, and its lack of responsiveness is thus normal. Examples of programs that may be found on the NLR list, but would not normally be found on the UP list, are Lotus Notes™, Microsoft Word™, Adobe Photoshop™, Microsoft Publisher™ and Microsoft Powerpoint™. Examples of programs that would normally be found on the UP list include Norton Antivirus Services™, WINLOGON, and various communication services.

The list of UP 128C preferably includes those programs that are part of the operating system 122, and possibly those associated with installed applications that normally run in a suspended or "not responding" mode of operation. The list of unresponsive programs 128C may be established at the time the operating system is installed, and can be updated as required when changes are made to the operating system 122, and/or when new applications are installed.

After the identities of the user non-responding programs are determined, the orderly shutdown procedure executed by the software module 128A attempts to read from the protected database 132 to determine if any of the non-responding user programs have any files open. If the fixed disk 130 is not accessible, the information is read from the copy 128B stored in the memory-resident database. The orderly shutdown procedure executed by the software module 128A then matches each non-responding program to any open file or files that it may have. During Step D the software module 128A operates to copy the identified file or files to a temporary space on the local fixed disk 132 and/or to the remote storage 165, e.g., a network disk, while identifying these files with, by example, a date and time stamp, as well as the name of the non-responding program. Depending on the application, other information may be available and may be stored, such as the last n keystrokes and/or blocks of copied text of a word processing application program. When the open file copy procedure terminates, the orderly shutdown procedure executed by the software module 128A may display a message box at Step E for indicating that any open files have been saved, and that it is safe for the user to shutdown the system.

After the computer system 100 is rebooted, the user is enabled to locate the saved version of the file or files in the protected area of the fixed disk 130 or the remote storage 165, and may then resume working at the point where work stopped, which is the desired result.

Depending upon the characteristics of the operating system 122 (e.g., Windows™, Linux™, Unix™) various different types of techniques may be employed for obtaining information regarding the applications or processes and their files. As an example, the Windows NT™ and Windows 2000™ approach to creating a list of processes and modules can be found from publically-available help posted on the Microsoft website. Briefly, this approach uses functions from a PSAPI.DLL file. The PSAPI.DLL file is distributed with the Platform SDK, available at: http://www.microsoft.com/msdn/sdk. PSAPI.DLL is the library used to gather process information on Windows NT™ and resides in the \SYSTEM32 directory.

In a manner similar to ToolHelp32 functions, the PSAPI.DLL also contains a variety of useful functions. Those functions that are relevant to enumerating processes and modules include:

EnumProcesses( )
EnumProcessModules( )
GetModuleFileNameExA( )

Briefly, a call is first made to EnumProcesses( ) to fill an array of process Ids. A ModList sample code example also includes a method of calculating the number of processes returned.

Next, OpenProcess( ) is called for each of the process IDs to retrieve a handle to the process, and if the handle is valid, then a call is made to EnumProcessModules( ) to enumerate the modules of the process. EnumProcessModules( ) fills an array, passed as a parameter, with the module handles associated with the process.

GetModuleFileNameExA( ) is used to retrieve the name of the module using the process handle and module handle as parameters. The module name would be the path and file name of the dll, ocx, etc., that the process has loaded.

It is noted that the name of a process may also be displayed in the list of modules for that process. If this is not desirable, then one may simply compare the module name to the process name before adding it to the list.

The on-line help mentioned above contains a Visual Basic™ example that is useful for illustrating how one may list the processes that are currently running on the computer system 100. The approach is different for Windows 95/98 and Windows NT/2000, and both solutions are described in the on-line help.

The invention was described above in the context of a system and method for performing an orderly shutdown of a malfunctioning computer system. It should be appreciated that the teachings of this invention also relate to a computer readable medium that stores program instructions for directing the operation of CPU 110 in executing the orderly shutdown of the malfunctioning computer system. The computer readable medium can include the fixed disk 130, the memory 120, a removable disk or tape, a read only memory device, or any suitable computer readable medium.

It should be noted that for the system to be considered non-responsive, it is not necessary for the system to have ceased to function. Instead, the functioning of the system may have degraded to the point where it becomes objectionable, or simply noticeable, to the user.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a digital data processing system, comprising steps of:
   detecting an activation of a user input that indicates that the system or a program executed by the system has become non-responsive to the user;
   determining an identification of any currently open files and programs with which currently open files are associated;
   determining an identification of those programs that are not normally in a non-responsive state; and
   saving those currently open files that are associated with programs that are identified as being not normally in the non-responsive state.

2. A method as in claim 1, and further comprising a step of notifying the user that any currently open files that are associated with programs identified as being not normally in the non-responsive state have been saved.

3. A method as in claim 2, and further comprising a step of restarting the digital data processing system, and retrieving at least one of the saved files.

4. A method as in claim 1, wherein the step of detecting is executed in response to the user manually activating a switch.

5. A method as in claim 1, wherein the step of detecting is executed in response to the user activating one or more keyboard keys.

6. A method as in claim 1, wherein the step of saving saves in association with the currently open files an identification of their associated programs.

7. A method as in claim 1, wherein the step of saving saves the currently open files in a data storage device that forms a part of the system.

8. A method as in claim 1, wherein the step of saving saves the currently open files in a data storage device that is remote from the system, and that is reached through a data communication network.

9. A method as in claim 1, wherein the step of determining an identification of any currently open files comprises a step of monitoring system file open and file close operations.

10. A method as in claim 1, wherein the step of determining an identification of any currently open files and programs with which currently open files are associated comprises steps of monitoring system file open and file close operations; and maintaining a record of those files that are currently open and a record of a program that opened the file.

11. A digital data processing system, comprising:
   at least one processing unit;
   a memory coupled to said processing unit; and
   a user interface bidirectionally coupled to said processing unit, said user interface comprising button means for activation by a user for indicating that the system or a program executed by the system has become non-responsive to the user; said processing unit being responsive to a detection of the activation of said button means for determining an identification of any currently open files and programs with which currently open files are associated, for determining an identification of programs that are not normally in a non-responsive state, and for saving those currently open files that are associated with programs that are identified as being not normally in the non-responsive state.

12. A system as in claim 11, wherein said processing unit further notifies the user, with said user interface, that any currently open files that are associated with programs identified as being not normally in the non-responsive state have been saved.

13. A system as in claim 11, wherein said processing unit saves in association with the currently open files an identification of their associated programs.

14. A system as in claim 11, wherein said memory comprises a disk, and wherein said processing unit saves the currently open files on said disk.

15. A system as in claim 11, and further comprising a network interface that bidirectionally couples said processing unit a data communications network, wherein the data communications network comprises a mass storage device, and wherein said processing unit saves the currently open files on said mass storage device.

16. A system as in claim 11, wherein during operation of said system said processing unit monitors file open and file close operations and maintains a record of open files in said memory.

17. A system as in claim 11, wherein during operation of said system said processing unit monitors file open and file close operations and maintains a record of open files in said memory, as well as a record of an identification of a program that opened the file.

18. A computer readable data storage medium for storing program instructions for execution by a processing unit of a digital data processing system that includes a memory coupled to said processing unit and a user interface bidirectionally coupled to said processing unit, wherein execution of said program instructions causes said processing unit to be responsive to activation of a user interface input, that indicates that the system or a program executed by the system has become non-responsive to the user, for determining an identification of any currently open files and programs with which currently open files are associated, for determining an identification of programs that are not normally in a non-responsive state, and for saving those currently open files that are associated with programs that are identified as being not normally in the non-responsive state, and for notifying the user, with said user interface, that the currently open files have been saved.

19. A computer readable data storage medium as in claim 18, wherein during operation of said system said program instructions further cause said processing unit to monitor file open and file close operations and to maintain a record of open files in said memory.

20. A computer readable data storage medium as in claim 18, wherein during operation of said system said program instructions further cause said processing unit to monitor file open and file close operations and to maintain a record of open files in said memory as well as a record of an identification of a program that opened the file.

* * * * *